United States Patent [19]

Pearson et al.

[11] Patent Number: 4,740,124
[45] Date of Patent: Apr. 26, 1988

[54] THREADED INSERT

[75] Inventors: Morton K. Pearson, Manchester; Thomas J. Madden, Vernon; Gerald R. Rider, Glastonbury, all of Conn.

[73] Assignee: United Technologies Corporation, Hartford, Conn.

[21] Appl. No.: 334,608

[22] Filed: Dec. 28, 1981

[51] Int. Cl.⁴ .................. F16B 39/02; F16B 39/10
[52] U.S. Cl. ........................................ 411/88; 411/90; 411/339
[58] Field of Search ............... 411/87, 88, 90, 91, 411/92, 93, 94, 116, 119, 122, 123, 427, 338, 339

[56] References Cited

U.S. PATENT DOCUMENTS

| | | | |
|---|---|---|---|
| 406,953 | 7/1889 | Perry | 411/90 X |
| 1,259,214 | 3/1918 | De Roja | 411/338 |
| 2,050,961 | 8/1936 | Olson | 411/122 X |
| 3,339,953 | 9/1967 | Bohn | 411/339 X |
| 3,414,304 | 12/1968 | Miller | 411/339 X |
| 4,346,734 | 8/1982 | Frank | 411/87 X |

FOREIGN PATENT DOCUMENTS

| | | | |
|---|---|---|---|
| 804871 | 5/1951 | Fed. Rep. of Germany | 411/339 |
| 616097 | 10/1926 | France | 411/339 |
| 681460 | 2/1930 | France | 411/90 |
| 654747 | 6/1951 | United Kingdom | 411/339 |

*Primary Examiner*—Gary L. Smith
*Attorney, Agent, or Firm*—Charles A. Warren

[57] ABSTRACT

In the mounting of an attachment to a base member, an insert which has a centrally located threaded hole and an outer cylindrical surface which has an interference fit with a cooperating hole in the base member and is adapted to receive a bolt extending through the attachment and into said insert, the insert having a head at the end remote from where the attachment is positioned with a flat surface on the head cooperating with a connector device by which turning of the insert in the base member is provided.

7 Claims, 1 Drawing Sheet

THREADED INSERT

DESCRIPTION

1. Technical Field

An insert is secured in the base and has a threaded hole to receive a bolt for securing a part to the base. The particular field is the attachment of the insert to the base member.

2. Background Art

In general these threaded inserts are secured to the substrate or base member as by locking threads that are intended to hold the insert securely in position during attachment of another part by a bolt received in the threaded insert. This type of insert applies stress to the substrate or base member surrounding the insert that may result in detrimental cracks in the substrate tending to weaken the member and possibly cause failure.

Other threaded inserts rely on other interaction with the substrate of this material which also can multiply the normal working stresses around the hole and do damage to the base structure. In media then, the securing mechanisms may not hold the insert securely against turning when positioning a bolt in or removing the bolt from the threaded hole in the insert.

DISCLOSURE OF INVENTION

A feature of the invention is an insert that will minimize the stress concentrations at and around the receiving socket or hole in the base and will also secure the insert against turning within the base. Another feature is the location of the insert in the receiving hole in the base member by an interference fit to minimize stresses in the base member.

Another feature is a flat and a tapered surface on the insert cooperating with mating surfaces on a connector through which the insert extends and which serves to prevent rotation of the insert.

According to the invention the insert has a cylindrical portion that is positioned in the substrate with an interference fit. That is to say, the insert is slightly larger by a few thousandths of an inch than the hole thereby requiring pressing of the insert into the hole and the insert has a tapered surface cooperating with the connector on the side of the substrate opposite to the end of the insert that receives the bolt therein. This connector and bolt have cooperating tangential surfaces that prevent turning of the insert within the connector. The latter generally has a second hole or multiple holes therein to receive means to prevent the connector from moving, such a hole being utilized, for example, by another threaded insert.

The foregoing and other objects, features and advantages of the present invention will become more apparent in the light of the following detailed description of the preferred embodiments thereof as shown in the accompanying drawing.

BEST MODE FOR CARRYING OUT THE INVENTION

Figure 1:
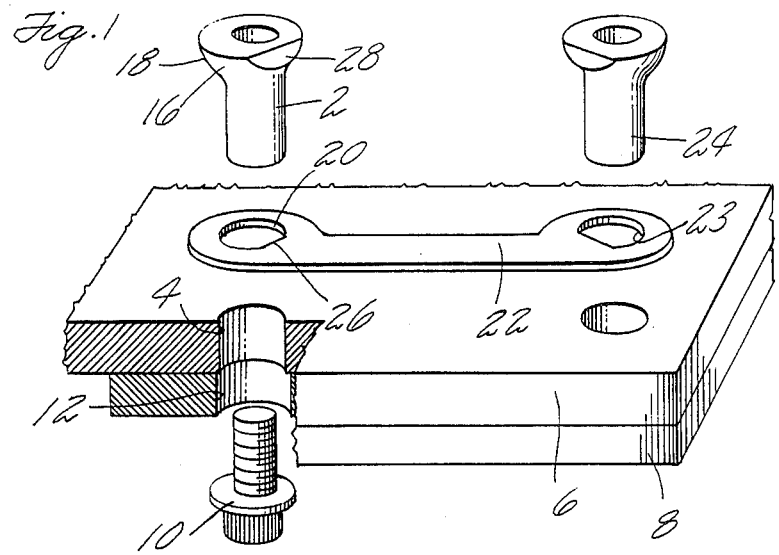
FIG. 1 is a perspective view of the device with the parts spaced from one another to show the relative arrangement.

Referring first to FIG. 1, the insert 2 is intended to be positioned in a hole 4 in the substrate or base member 6 which may be, for example, a structural part such as a flange to which another part 8 is secured by a bolt 10 extending through a hole 12 in the part 8 and into the axial extending threaded hole 14 in the insert. The portion of the insert located within the substrate is cylindrical as is the hole 4 that receives it and the dimensions of the hole and bolt are dimensioned, the cylindrical portion thereof, such as to provide an interference fit therebetween. That is to say, the insert is slightly larger than the hole as by one or two thousandths of an inch providing a secure fit therein. The threaded inserts should end at the surface of the substrate as shown.

The insert has a head 16 merging with the cylindrical portion by a tapered portion 18 that is intended to fit against and partially enter a hole 20 in a connector 22 engaging with the substrate on the side opposite the part 8 to be attached. The connector in general has an extending portion having another hole 23 therein that routinely receives means for preventing the connector from turning such as another insert 24 functioning in the manner of the insert 2.

Figure 2:
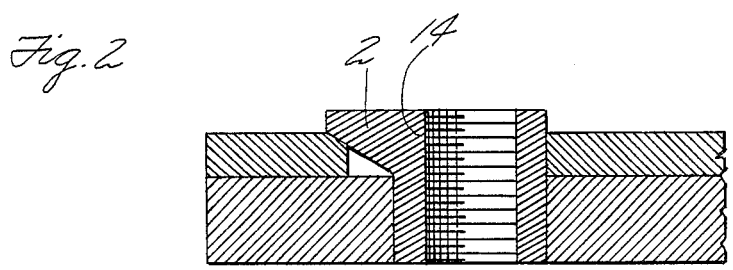
FIG. 2 is a sectional view on the larger scale through the insert.

The hole 20 has a tangential part 26 to cooperate with a tangential flat surface 28 on the insert. In this manner when the insert is installed as in FIG. 2 with the end of the insert remote from the head coincident with the surface of the substrate the flat surfaces are in engagement with one another as shown and the tapered surfaces are in secure engagement. The interference fit will hold the insert in the position of FIG. 2 in readiness for attachment of another part such as the part 8.

Figure 3:
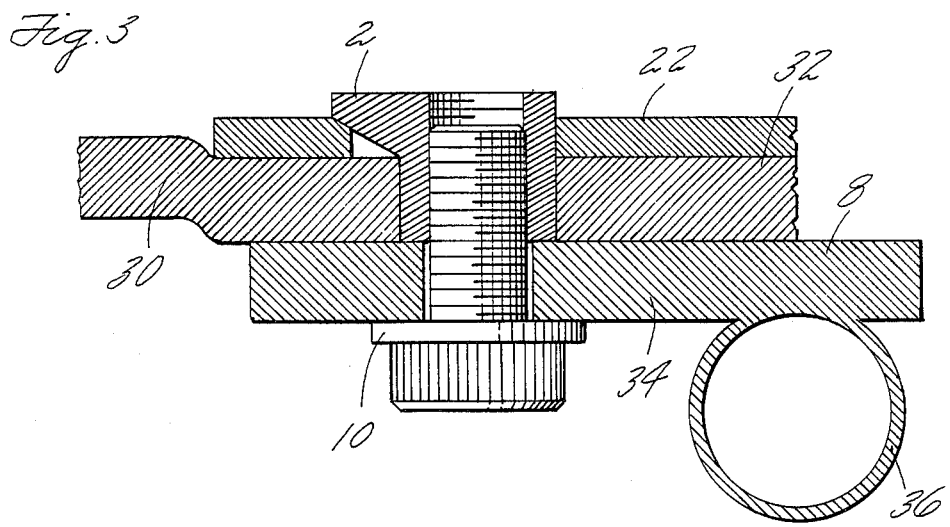
FIG. 3 is a view similar to FIG. 2 with the securing bolt in position in the insert.

The part 8 is then attached by the bolt 10. As shown in FIG. 3, the bolt extends through the hole 12 and is threaded into the insert. The bolt 10 may be securely tightened as the cooperating flat surfaces hold the insert against turning within the connector and substrate. Because the hole in the substrate is a cylindrical hole and the insert is an interference fit, the substrate is loaded around the hole by a uniform radial compressive stress thereby reducing localized stress concentration and local distortion which causes cracking around the hole in a substrate. The radial compressive stress and reduced local distortion thus sustains the life of the substrate.

These devices are frequently used where there is a series of inserts in the substrate in a preferred arrangement such that two or more inserts are used in attachment of the other part to the base member or substrate and thus a connector as shown in FIG. 1 would be a common construction. If only one insert is used, the other end of the connector may be secured by any suitable means to the substrate. The simplicity of the attachment by an interference fit and the connector permits in many instances the use of a thinner substrate than in installations of other types of insert that require threaded attachment to the substrate or other mechanical interconnection with the substrate. Obviously if there is a need for a longer bolt to hold the flange on the attached part in position the insert may be extended beyond the head to provide a longer threaded hole.

One example of a particular attachment where this insert is valuable is shown graphically in FIG. 3. In this figure the substrate is an engine case 30 having a mounting boss 32 formed thereon to receive the insert and the attached part is a flange 34 having formed thereon a bracket 36 supporting an ancillary device not shown in predetermined position on the engine case.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A device for securing a part to a base member said device including:
    an insert having a centrally located threaded hole therein;
    an outer cylindrical surface on said insert, and a tapering head on said insert at one end of the cylindrical surface, said head having a flat at one side thereof;
    a connector having a hole to receive the insert and a flat surface at one side of the hole cooperating with the flat on said head, said tapering head engaging the edge of said hole in the connector to retain the latter in position, all in combination with,
    a base member having a hole to receive the insert with the connector on one side of the base member, the insert having an interference fit through the hole in the base member to be retained therein by said interference fit.

2. A device as in claim 1 in which the insert terminates at the surface of the base member opposite to the connector.

3. A device as in claim 1 in which the connector has means to prevent turning of the connector on the surface of the base member.

4. A device as in claim 3 in which said means includes a second hole positioned in said second connector and means in said hole and engaging said base member.

5. The combination with a base member having a hole therein of a device attached to the base member to receive a securing bolt therein said device including:
    an insert having a centrally located axially extending threaded hole, and
    an outer cylindrical surface;
    a tapered head at one end of said cylindrical surface and having a flat thereon; and
    a connector having a hole therein to receive said insert and having a flat in said hole to cooperate with the flat on the insert,
    said insert being inserted in the hole in said base member with the connector engaging said head at one side of the base member, and with the tapered head engaging the edge of the hole in the connector to retain the latter in position,
    said cylindrical surface having a dimension to provide an interference fit with the hole in the base member when inserted therein;
    said insert terminating substantially at the surface of the base member remote from the connector.

6. A device as in claim 5 including an attachment secured to said base member and having a hole therein; and
    a bolt extending through said last mentioned hole and into the threaded hole in the insert, said bolt holding said attachment to said base member.

7. The combination as in claim 5 including means for preventing turning of the connector on the surface of said base member.

* * * * *